Oct. 11, 1927.
W. KROLL
1,644,925
RESILIENT VEHICLE WHEEL
Filed Aug. 6, 1926
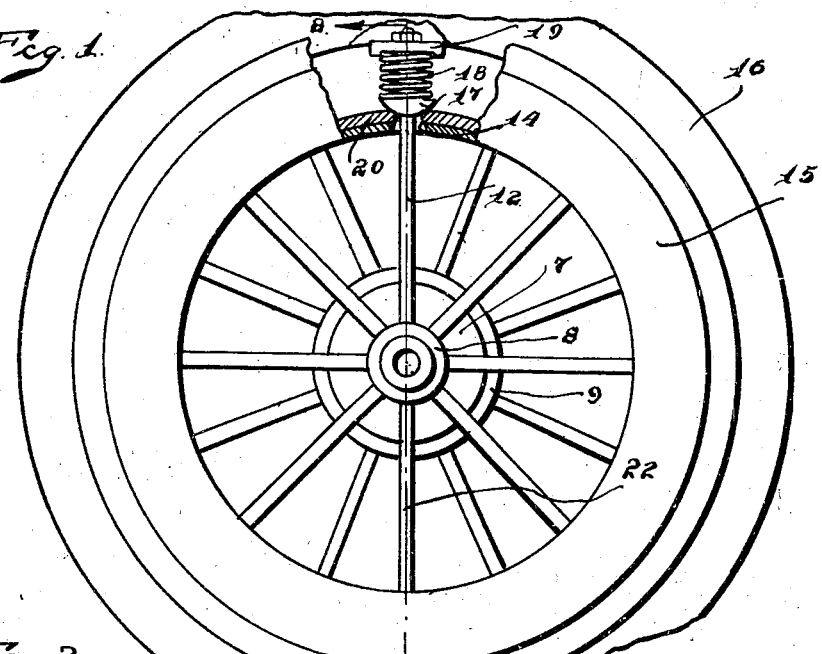
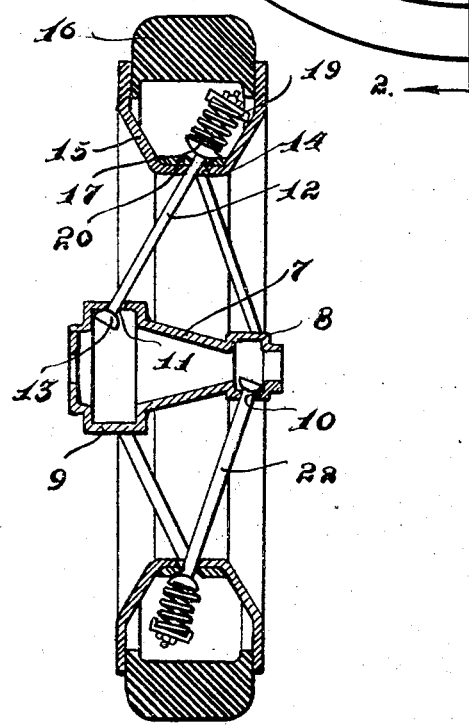
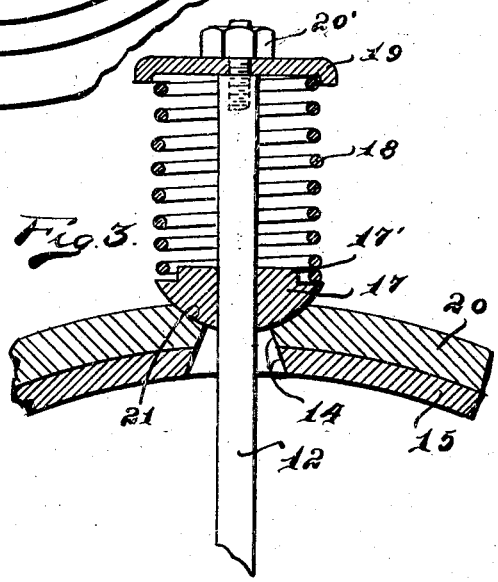
INVENTOR.
Walter Kroll.
BY
Thos J Donnelly
ATTORNEY.

Patented Oct. 11, 1927.

1,644,925

UNITED STATES PATENT OFFICE.

WALTER KROLL, OF DETROIT, MICHIGAN.

RESILIENT VEHICLE WHEEL.

Application filed August 6, 1926. Serial No. 127,513.

My invention relates to a new and useful improvement in a vehicle wheel and has for its object the provision of a vehicle wheel so constructed and arranged that it may be used with a solid tire and yet afford the resiliency and ease in riding which is accomplished by the use of pneumatic tires.

Another object of the invention is the provision of a vehicle wheel having a felly in floating condition relatively to the hub.

Another object of the invention is the provision of a channel-shaped felly forming member in which the tire may be mounted and provided with a plurality of spokes projecting inwardly of the channel from the hub, so arranged and constructed as to permit a longitudinal movement of the spokes against the compression of a spring.

Other objects will appear hereinafter.

The invention consists in the combination and arrangement of parts hereinafter described and claimed.

The invention will be best understood by a reference to the accompanying drawings which form a part of this specification and in which:

Fig. 1 is a side elevational view of the invention with parts in section and parts broken away.

Fig. 2 is a sectional view taken on substantially line 2—2 of Fig. 1.

Fig. 3 is an enlarged sectional fragmentary view illustrating the outer end of the spoke.

The invention comprises a substantially conical-shaped hub 7 having itself reduced and provided with an enlargement 8, the periphery of which extends axially of the hub. The enlarged end of the hub is also provided with an enlargement 9, the periphery of which extends axially of the hub. Formed in the enlargements are a number of openings 10 and 11. A plurality of spokes 12, each provided with a semi-spherical head 13, is projected through the openings 11 and through enlarged openings 14 formed in a channel shaped felly forming member 15 in which is suitably mounted a solid rubber tire 16. Slidably mounted on the spokes 12 interiorly of the channel in the member 15 is a semi-spherical shield 17, one end of a spring 18 engaging against this shield 17 and the other end engaging against a suitable washer or web 19, which is secured by the nut 20 on the spoke 12. Positioned on the base of the felly forming member 15 is a plate 20 which has a concaved seat 21 formed therein in which the shield 17 may engage. As clearly shown in Fig. 3 the shield 17 is provided with a neck 17' about which the end of the spring 18 is positioned.

It will be noted that the spokes 12 incline in one direction to the plane of the felly and that the spokes 22 incline in the other direction. the mounting of the various spokes being the same in all respects, excepting that the spokes 22 project through the openings 10.

In operation, as the weight is placed upon the hub 7, through which the axle projects, the felly will be moved upwardly relatively to the hub, this upward movement being resisted by the springs at the upper side which will be compressed. There is, as shown in the drawings considerable clearance in the openings 11 and 14, so that a universal movement of the spokes may be effected in this floating displacement of the felly forming member 15 relatively to the hub 7. In this way the felly is carried in a truly floating condition adapted to accommodate itself to variations in the road over which the wheel is driven and to accommodate itself to sudden jars and variations in the load on the vehicle.

It is believed that the invention is one which is quite efficient in use, while at the same time it is durable in structure, and economical to manufacture.

While I have illustrated and described the preferred form of my invention, I do not wish to limit myself to the precise form of structure shown, but desire to avail myself of such variations and modifications as may come within the scope of the appended claims.

Having thus described my invention, what I claim as new and desire to secure by Letters Patent is:

1. A vehicle wheel of the class described comprising a channel shaped felly forming member; a plate positioned on the outer surface of the base of said member, said member having a plurality of openings formed in its base and said plate having openings formed therein in registration with the openings in said base, said plate being countersunk at said openings; a hub; a plurality of spokes projecting loosely outwardly from said hub and extending through said openings into the channel of said felly forming member; a substantially semi-spherical plate loosely mounted on each of said spokes interiorly of the channel of said felly forming member; a spring mounted on each of said spokes in embracing relation and engaging at one end said substantially semi-spherical plate; and a washer secured to said spoke for engaging the other end of said spring.

2. A vehicle wheel of the class described comprising a tubular hub having a bulge formed adjacent each end for providing a peripheral chamber; a plurality of spokes projecting outwardly from said hub at an incline to the axis of said hub; a head fixed on each of said spokes and positioned within said chambers, each of said chambers having an enlarged opening for the projection of said spokes therefrom and permitting loose play of said spokes in said opening; a channel shaped felly forming member having a plurality of openings formed in its base for the reception of the outer end of said spokes; a plate mounted on the outer surface of the base of said felly forming member having a plurality of openings in registration with the openings in said base; the outer surface of said plate being countersunk at said openings to provide a substantially semi-spherical seat; a substantially semi-spherical engagement member loosely mounted on each of said spokes and engaging in said semi-spherical seat; a neck projecting outwardly from the outer face of said engagement member; a coiled spring embracing at one end said neck; a washer mounted on the outer end of said spokes for engaging the opposite end of said spring, said spokes being adapted for universal movement through said openings and said springs resisting radial movement of said felly forming member from said hub.

3. A vehicle wheel of the class described comprising a tubular hub having a bulge formed at opposite ends to provide a chamber, each of said bulges being provided with a plurality of openings in its periphery; a spoke loosely projected through each of said openings and inclined to the axis of said hub; a head fixedly mounted on each of said spokes positioned within said chamber for limiting the withdrawal of said spoke from said hub; a channel shaped felly forming member having a plurality of openings formed therein; a plate positioned on the base of said felly forming member interior of the channel thereof; a plate having a plurality of openings registering with openings formed in said base; said openings being adapted for the reception of the outer end of said spokes and permitting free play of the spokes therein; a substantially semi-spherical engagement member loosely mounted on each of said spokes interiorly of said channel and adapted for seating in a substantially spherical recess formed in said plate around the opening formed therein; a neck projecting outwardly from said engagement member; a coiled spring positioned about the outer end of said spoke in embracing relation and embracing at one end said neck; a washer mounted on the outer end of said spoke for engaging the other end of said spring; and a tire mounted in said channel member, the inner side of said tire being spaced from the base of said felly forming member for permitting longitudinal movement of said spokes. said springs resisting withdrawal of said felly forming member from said hub.

In testimony whereof I have signed the foregoing.

WALTER KROLL.